Sept. 9, 1924.                    1,508,078
J. TIMKO
FISHING REEL
Filed Nov. 24, 1922      3 Sheets-Sheet 2

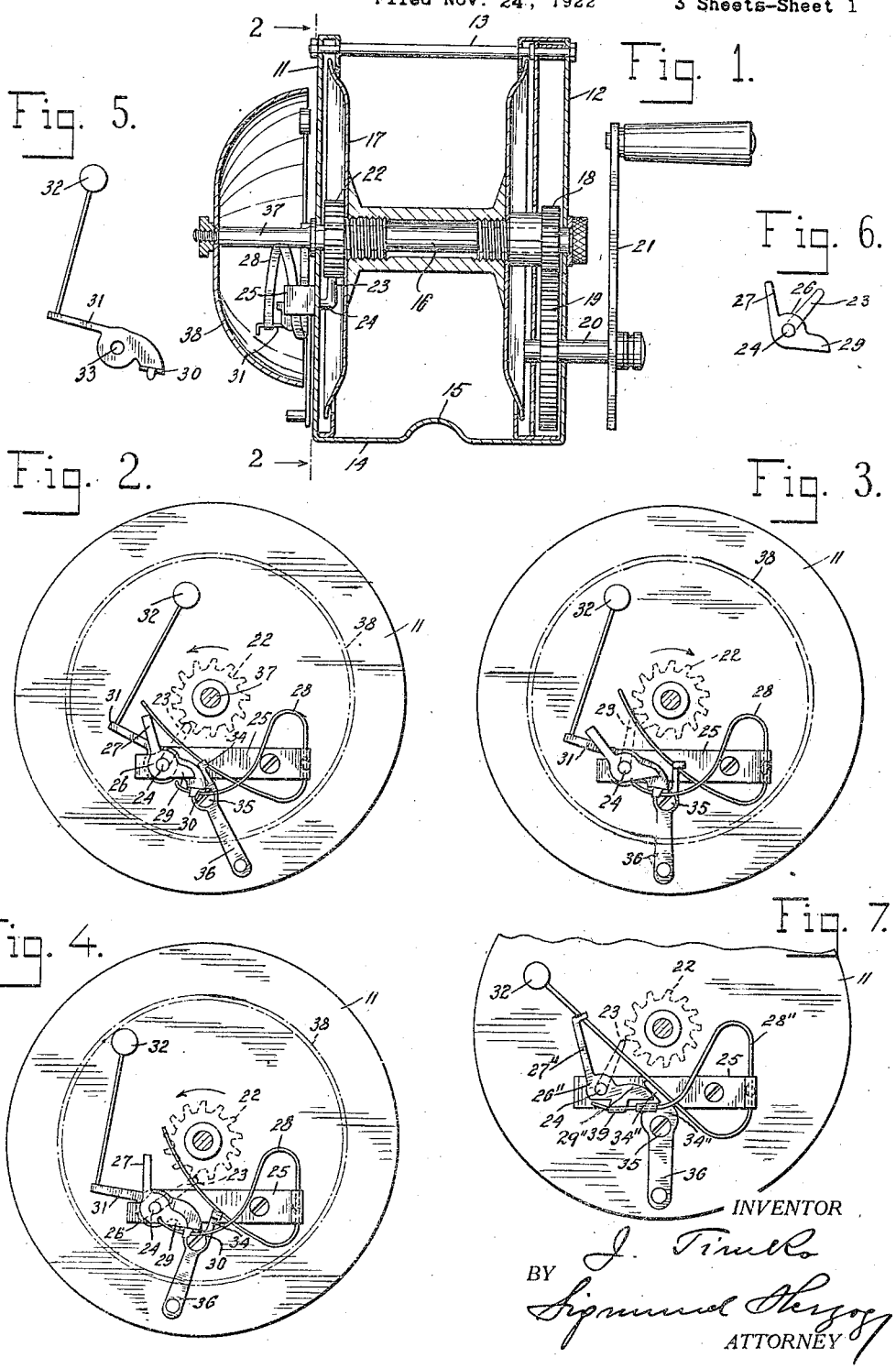

INVENTOR
J. Timko
BY
Sigmund Herzog
ATTORNEY

Sept. 9, 1924.

J. TIMKO 1,508,078

FISHING REEL

Filed Nov. 24, 1922 3 Sheets-Sheet 3

INVENTOR
J. Timko
BY
Sigmund Herzog
ATTORNEY

Patented Sept. 9, 1924.

1,508,078

UNITED STATES PATENT OFFICE.

JOSEPH TIMKO, OF NEW YORK, N. Y.

FISHING REEL.

Application filed November 24, 1922. Serial No. 602,981.

*To all whom it may concern:*

Be it known that I, JOSEPH TIMKO, a citizen of the United States, and resident of the city of New York, in the county of New York and State of New York, have invented certain new and useful Improvements in Fishing Reels, of which the following is a specification.

The present invention relates to improvements in fishing-reels, and has for its main object to provide a fishing-reel with a simple and efficient device which makes an audible signal when a fish has been hooked on the line.

Another object of the invention is to so construct the signal device that it may be conveniently attached to fishing-reels of any suitable type without necessitating material changes in the construction of the latter.

A further object of the invention is to so construct the signal device that it may be easily thrown out of action, at the will of the operator, and, when so rendered inoperative, does not interfere in any way with the proper operation of the reel.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

A few of the many possible embodiments of the invention are illustrated in the accompanying drawings, in which:—

Figure 8:
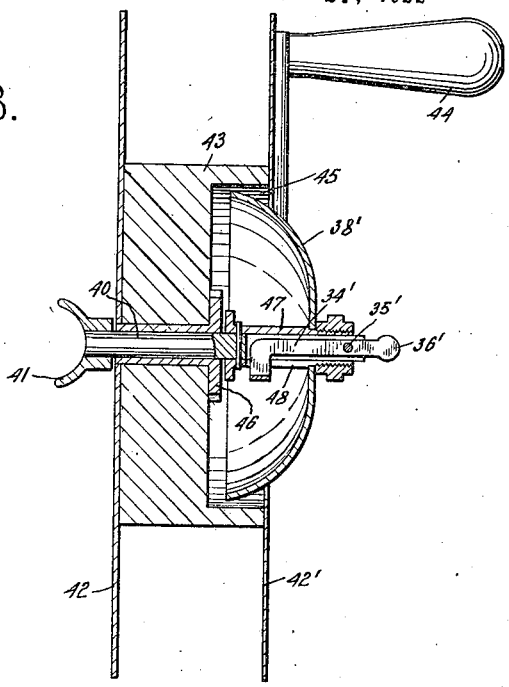
Figure 10:
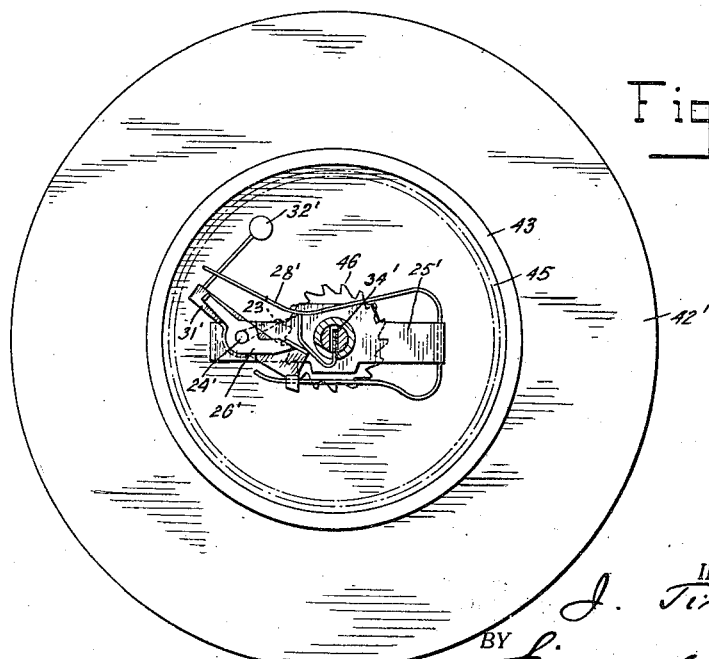
Figure 9:
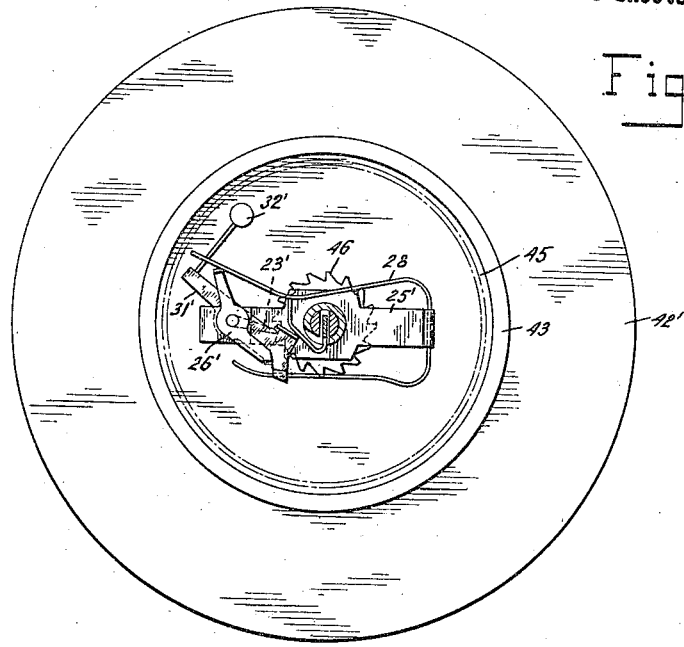
Figure 11:
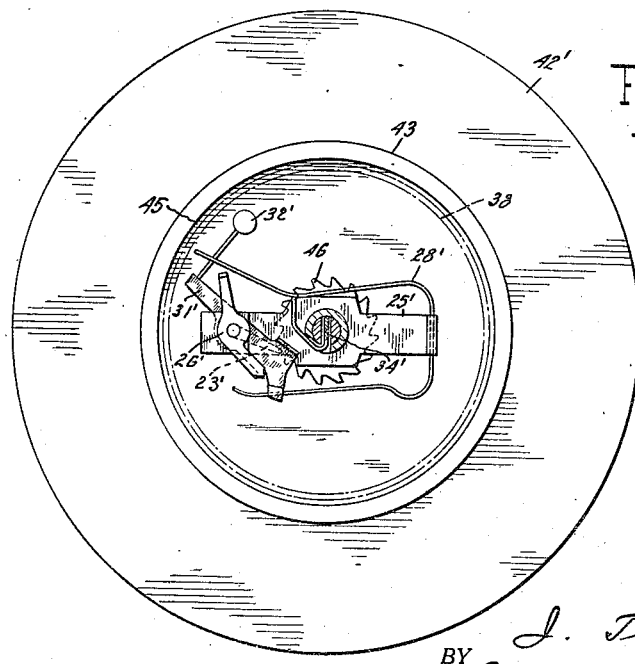

Figure 1 is a central section taken through a fishing-reel, provided with a signal device constructed in accordance with the present invention; Fig. 2 is a section taken on line 2—2 of Fig. 1, the elements of the signal device being in inoperative positions; Fig. 3 is a section similar to the one shown in Fig. 2, the click or detent of the reel being disengaged from the spool ratchet; Fig. 4 is a section similar to the one shown in Fig. 2, with the elements of the signal device in operative positions; Fig. 5 is a front elevation of a bell hammer and its actuating means, forming part of the signal device; Fig. 6 is a front elevation of the click; Fig. 7 is a section similar to the one shown in Fig. 3 of a modified construction; Fig. 8 is a central section taken through a fishing-reel and a further modification of the signal device mounted thereon; Fig. 9 is a side elevation of the said reel, the bell being removed and the signal device being shown thrown out of action; Fig. 10 is a similar elevation with the click disengaged from the spool ratchet; and Fig. 11 is a similar elevation, showing the elements of the signal device in operative positions.

Referring now first to Figs. 1 to 6, inclusive, of the drawings, the numerals 11 and 12 indicate the two heads of a reel, which are united by pillars 13, one of which, denoted by the numeral 14, is, preferably, made integral with the said heads and provided with a base plate 15, that is curved in cross section, to fit the reel holder on the fishing rod. Through the heads extends centrally a spindle 16, which is fixed in any suitable manner to the said heads and has rotatably mounted thereon a spool 17 of any suitable construction. To the spool is attached a pinion 18, in mesh with a gear 19, the latter being mounted on a shaft 20, provided with a crank handle 21. To the spool is furthermore attached a ratchet wheel 22 for a purpose hereinafter to be described. Thus far described, the construction and operation of the elements are well known, so that a further detailed description thereof is unnecessary. Attention is called to the fact that the elements thus far described may be of any other suitable construction, the particular reel described being disclosed for purposes of illustration only.

With the ratchet wheel co-operates a detent or click 23, with which is made integral a short spindle 24, that extends through the head 11 and is suitably journaled in a bearing member 25 on the outer face of the said head. To the said short spindle is rigidly attached a bellcrank lever 26, one arm of which, denoted by the numeral 27, is adapted to co-operate with a spring 28, while its other arm, denoted by the numeral 29, co-acts with the outwardly bent portion 30 of a lever 31, the latter carrying a bell hammer 32. The lever 31 is provided with an aperture 33, through which the short spindle 24 extends, the said lever being adapted to freely swing on the said short spindle. The spring 28 is in the form of a blade spring, fixed intermediate its ends to the bearing member 25, the ends of the said spring crossing one another, as clearly shown in Figs. 2 to 4, inclusive, of the drawings, one end being adapted to abut against the arm 27 of the bellcrank lever 26 and its other end bearing continuously against the outwardly bent portion 30 of the lever 31. With the spring 28 and the lever 31 co-operates a shifter 34, that is fulcrumed at 35 to the outer face of the head 11, it being adapted to bear against the said lever 31, as clearly shown in Fig. 2 of the drawings, that end of the spring 28 which abuts against the arm 27 of the bellcrank lever 26 bearing also against the said shifter. The shifter is provided with a handle 36, to facilitate its operation.

The spindle 16 is extended beyond the head 11, as shown at 37, and has attached to it in any suitable manner a bell 38, which the hammer 32 is adapted to strike.

The operation of the reel is as follows: before casting or paying out the line, the elements are brought into the positions shown in Fig. 2 of the drawings, in which the spring 28 bears against the arm 27 of the bellcrank lever 26 and the lever 31 is held by the shifter 34 in a position in which the arm 29 of the said bellcrank lever cannot act on the outwardly bent portion 30 of the lever 31. The click is, in these positions of the elements, in engagement with the ratchet wheel 22, it being held in engagement therewith by the spring 28 bearing against the arm 27 of the bellcrank lever 26. The reel operates thus in the usual manner. After the line has been cast or paid out, the handle 36 of the shifter 34 is moved from the position shown in Fig. 2 of the drawings into the position shown in Fig. 4 of the drawings, whereby the spring 28 is disengaged from the arm 27 of the bellcrank lever 26 and the shifter disengaged from the lever 31. The other end of the spring 28 thereby immediately moves the outwardly bent portion 30 of the lever 31 into engagement with the arm 29 of the bellcrank lever, the elements occupying the positions shown in Fig. 4 of the drawings. When now a fish hooks itself on the line and thereby moves the ratchet wheel 22 in the direction of the arrow shown in Fig. 4 of the drawings, the said ratchet wheel rides over the click 23, each tooth of the ratchet wheel causing the arm 29 of the bell crank lever to swing downwards, carrying with it the lever 31, the spring 28, now acting on the outwardly bent portion 30 of the lever 31, causing the elements to return into the positions shown in Fig. 4 of the drawings. The bell hammer 32 is thus oscillated, striking thereby the bell 38 and producing an audible signal to let the fisherman know that a fish has been hooked. Before drawing in the line, the handle 36 of the shifter is moved into central position, shown in Fig. 3 of the drawings, whereby, in drawing in the line, the click is automatically disengaged from the ratchet wheel, thus permitting of a convenient and quick taking in of the line.

The construction shown in Fig. 7 of the drawings differs from that above described only in that the bell hammer 32 is directly attached to that end of the spring 28″ which is adapted to abut against the arm 27″ of the bellcrank lever 26″, and that its other end abuts against an outwardly bent portion 39 on the arm 29″ of the said bellcrank lever. The shifter 34″ co-operates with the spring 28″. Otherwise the construction and operation of the elements are the same as above described.

A further modification of the invention is illustrated in Figs. 8 to 11, inclusive, of the drawings. The reel shown in these figures is an ordinary deep sea reel, including a spindle 40, attached to a base plate 41, by means of which the reel is affixed to the fishing rod. On the spindle is rotatably mounted a spool, including two heads 42 and 42′, between which is disposed a hub 43, the heads and hub being rigidly secured together. To the head 42′ is attached a crank handle 44. The hub 43 is provided with a recess 45, within which is located a ratchet wheel 46, that is fixed to the hub. To the spindle 40 is keyed, or otherwise secured, a bearing member 25′, having a sleeve-like extension 47, and on this bearing member is mounted the short spindle 24′ of the click 23′. To this short spindle is fixed a bellcrank lever 26′, as in the construction above described. A spring 28′ co-operates with the said bellcrank lever and with a lever 31′, carrying a bell hammer 32′. The bell hammer co-operates with a bell 38′, secured to the sleeve-like extension 47 of the bearing member 25′. A shifter 34′ is mounted within the sleeve-like extension 47, it being in the form of a lever that is fulcrumed at 35′ to the said sleeve-like extension, its outer end, constituting a handle 36′, projecting beyond the said sleeve-like extension, while its inner end projects through a longitudinal slot 48 in the said sleeve-like extension and bears against the lever 31′. The construction shown in Figs. 8 to 11, inclusive, of the drawings differs thus mainly from the construction shown in Figs. 1 to 6, inclusive, of the drawings, in that the shifter is mounted in a sleeve-like extension of the bearing member, on which the bellcrank lever 26′ and lever 31′ are disposed. Otherwise the construction and operation of the elements are the same.

What I claim is:—

1. A fishing reel, comprising a rotating member for the line, a relatively fixed element rotatably supporting said member, a ratchet wheel attached to said rotating member, a click co-operating with said wheel mounted on said fixed element, an audible signal operated by said click, and means capable of rendering said audible signal inoperative without disturbing the operative position of said click relative to said ratchet wheel.

2. A fishing reel comprising a rotating member for the line, a relatively fixed element rotatably supporting said member, a ratchet wheel attached to said rotating member, a click co-operating with said wheel mounted on said fixed element, and an audible signal operated by said click when said line is paid out.

3. A fishing reel comprising a rotating member for the line, a relatively fixed element rotatably supporting said member, a ratchet wheel attached to said rotating member, a click co-acting with said wheel mounted upon said fixed element, a bell hammer oscillatably mounted on said fixed element, and co-acting means on said click and bell hammer for actuating the latter when a pull is exerted on the line by a caught fish.

4. A fishing reel according to claim 3, comprising means for preventing co-operation between said click and bell hammer without disturbing the operative position of said click relative to said ratchet wheel.

Signed at New York, in the county of New York, and State of New York, this 22nd day of November, A. D. 1922.

JOSEPH TIMKO.